US012205784B2

(12) United States Patent
Djogo

(10) Patent No.: US 12,205,784 B2
(45) Date of Patent: Jan. 21, 2025

(54) TRIGGERED VACUUM GAP THAT CONTROLLABLY SUSTAINS A VACUUM ARC THROUGH CURRENT ZEROS

(71) Applicant: S&C Electric Company, Chicago, IL (US)

(72) Inventor: Goran Djogo, Mount Prospect, IL (US)

(73) Assignee: S&C Electric Company, Chicago, IL (US)

( * ) Notice: Subject to any disclaimer, the term of this patent is extended or adjusted under 35 U.S.C. 154(b) by 792 days.

(21) Appl. No.: 17/400,418

(22) Filed: Aug. 12, 2021

(65) Prior Publication Data

US 2022/0102944 A1 Mar. 31, 2022

Related U.S. Application Data

(60) Provisional application No. 63/084,841, filed on Sep. 29, 2020.

(51) Int. Cl.
*H01H 33/664* (2006.01)
*H01T 2/02* (2006.01)
*H01T 15/00* (2006.01)

(52) U.S. Cl.
CPC ............ *H01H 33/664* (2013.01); *H01T 2/02* (2013.01); *H01T 15/00* (2013.01)

(58) Field of Classification Search
CPC .. H01T 2/02; H01T 15/00; H01T 2/00; H01T 1/12; H01T 1/14; H02H 7/24; H02H 9/06
See application file for complete search history.

(56) References Cited

U.S. PATENT DOCUMENTS 3,323,002 A 5/1967 Lafferty
3,489,873 A 1/1970 Kurz et al.
(Continued)

FOREIGN PATENT DOCUMENTS

CN 103311808 A 9/2013
JP H01186780 A 7/1989

OTHER PUBLICATIONS

Hiroshi Arita et al.; "Switching Characteristics of the Triggered Vacuum Gap for a High-Repetition-Rate Pulse-Power Source"; IEEE Transactions on Plasma Science vol. 20 No. 2; Apr. 1992; pp. 76-79 (4 pages).

(Continued)

*Primary Examiner* — Gustavo A Rosario-Benitez

(57) ABSTRACT

A triggered vacuum gap (TVG) device that has application as a closing switch for synchronized closing in distribution and transmission power systems. The TVG device controllably sustains a current arc in the device through initial current zeros created by power system transients and, thereby, prevents premature interruption of the closing operation. The TVG device includes main electrodes defining a vacuum gap therebetween and a triggering electrode providing a triggering gap between one main electrode and the triggering electrode. The TVG device also includes a triggering circuit having a high voltage impulse source that supplies a fast rising impulse voltage to the one main electrode and the triggering electrode for creation of a plasma to provide an initial breakdown of the triggering gap and a low voltage unidirectional current source that supplies current to the one main electrode and the triggering electrode once the first triggering gap breakdown has occurred.

13 Claims, 4 Drawing Sheets

(56) References Cited

U.S. PATENT DOCUMENTS

| | | | | | |
|---|---|---|---|---|---|
| 3,751,716 | A * | 8/1973 | Johnson | H02H 7/16 361/58 |
| 3,787,803 | A * | 1/1974 | Beebe | G01S 7/529 367/901 |
| 4,126,808 | A | 11/1978 | Rich | |
| 4,131,826 | A * | 12/1978 | Harris | H02M 1/04 315/234 |
| 4,224,550 | A * | 9/1980 | Rich | H01H 33/6646 218/123 |
| 5,317,574 | A * | 5/1994 | Wang | H01S 4/00 372/5 |
| 5,449,989 | A * | 9/1995 | Correa | H02M 3/15 315/111.21 |
| 5,854,729 | A * | 12/1998 | Degeneff | H01H 33/59 361/13 |
| 8,319,136 | B2 * | 11/2012 | Byron | H01H 79/00 218/126 |
| 9,048,039 | B2 * | 6/2015 | Crane | H01H 9/54 |
| 2009/0246542 | A1 * | 10/2009 | Nakao | H05H 1/46 118/723 R |

OTHER PUBLICATIONS

J.M. Lafferty; “Triggered Vacuum Gap”; Proceedings of the IEEE vol. 54 No. 1; Jan. 1966; pp. 23-32 (11 pages).

Liao Min-fun et al.; “Delay Characteristics and Controller Design of a Triggered Vacuum Switch”; IEEE Transaction on Plasma Science vol. 35 No. 4; Aug. 2007; pp. 891-895 (6 pages).

D.F. Alferov et al.; “High-Current Vacuum Triggered Switching Devices”; IEEE Transactions on Magnetics vol. 39 No. 1; Jan. 2003; pp. 406-409 (4 pages).

* cited by examiner

TRIGGERED VACUUM GAP THAT CONTROLLABLY SUSTAINS A VACUUM ARC THROUGH CURRENT ZEROS

CROSS-REFERENCE TO RELATED APPLICATION

This application claims the benefit of priority from the U.S. Provisional Application No. 63/084,481, filed on Sep. 29, 2020, the disclosure of which is hereby expressly incorporated herein by reference for all purposes.

BACKGROUND

Field

This disclosure relates generally to a triggered vacuum gap (TVG) device and, more particularly, to a TVG device including a triggering circuit for applying voltage across a triggering gap between a main electrode and a triggering electrode.

Discussion of the Related Art

An electrical power distribution network, often referred to as an electrical grid, typically includes a number of power generation plants each having a number of power generators, such as gas turbines, nuclear reactors, coal-fired generators, hydro-electric dams, etc. The power plants provide power at a variety of medium voltages that are then stepped up by transformers to a high voltage AC signal to be provided on high voltage transmission lines that deliver electrical power to a number of substations typically located within a community, where the voltage is stepped down to a medium voltage. The substations provide the medium voltage power to a number of three-phase feeder lines. The feeder lines are coupled to a number of lateral lines that provide the medium voltage to various distribution transformers, where the voltage is stepped down to a low voltage and is provided to a number of loads, such as homes, businesses, etc.

Periodically, faults occur in the distribution network as a result of various things, such as animals touching the lines, lightning strikes, tree branches falling on the lines, vehicle collisions with utility poles, etc. Faults may create a short-circuit that increases the load on the network, which may cause the current flow from the substation to significantly increase, for example, many times above the normal current, along the fault path. This amount of current causes the electrical lines to significantly heat up and possibly melt, and also could cause mechanical damage to various components in the substation and in the network. Many times the fault will be a temporary or intermittent fault as opposed to a permanent or bolted fault, where the thing that caused the fault is removed a short time after the fault occurs, for example, a lightning strike, where the distribution network will almost immediately begin operating normally.

Fault interrupters, such as reclosers, are provided on utility poles and in underground circuits along a power line and have a switch to allow or prevent power flow downstream of the recloser. These reclosers detect the current and voltage on the feeder to monitor current flow and look for problems with the network circuit, such as detecting a fault. If fault current is detected the recloser is opened in response thereto, and then after a short delay is closed in a process for determining whether the fault is still present. If fault current flows when the recloser is closed, it is immediately opened. If the fault current is detected again or two more times during subsequent opening and closing operations, then the recloser remains open, where the time between tests may increase after each test.

Reclosers are known that use pulse testing technologies where the closing and then opening of switch contacts is performed in a pulsed manner, where the pulses are typically less than one-half of a current cycle, so that the full fault current is not applied to the network while the recloser is testing to determine if the fault is still present. Pulse closing technologies have been successful in significantly reducing fault current stresses on network equipment during recloser testing. However, the switching devices required to generate these short pulse durations are relatively complicated and expensive. For example, vacuum interrupters employed to generate these pulses often use two magnetic actuators, one to close the contacts and one to quickly open the contacts using the moving mass of the opening actuator to reverse the direction of the closing actuator, well understood by those skilled in the art.

It has been proposed to employ TVG devices as the switching mechanism for use in pulse testing that does not require moving parts. A typical TVG device includes two stationary main electrodes positioned within a vacuum chamber, where a main vacuum gap is defined between the electrodes. The TVG device also includes a triggering element, such as a triggering electrode, where a triggering vacuum gap is provided between the triggering electrode and the corresponding main electrode. The triggering gap is designed to have a much smaller gap length than the main vacuum gap so that its breakdown voltage is much lower than the breakdown voltage of the main gap. The triggering gap can be bridged by a ceramic insulator in order to make its breakdown voltage even lower. When a sufficiently high triggering voltage impulse is applied to the main electrode and the triggering electrode across the triggering gap, the triggering gap breaks down and a plasma cloud is created that propagates in a fraction of microsecond into the main gap and causes breakdown of the main gap, where this state of the TVG device represents a closed switch. Once the current flow in the TVG device begins it does not stop until the AC current signal on the electrodes cycles through a zero crossing point. When this occurs, the plasma is extinguished by the vacuum and the arc dissipates. Because the plasma can be ignited in the vacuum chamber in this manner, the timing of when the device conducts can be tightly controlled, i.e., on the order of micro-seconds. Further, because the electrodes don't move, there is not a requirement for an accurate mechanical actuation.

Early TVG devices used a gas evolving triggering electrode with a titanium hydride coating to have a low breakdown voltage of the triggering gap and to have an easy and abundant production of the triggering plasma. Because a titanium hydride coating cannot withstand high temperatures necessary in the processing of TVG devices in a vacuum furnace, other TVG designs have been introduced without gas evolving coating. For those TVG device designs the triggering plasma is created completely by evaporation of electrode metal material by a vacuum arc in the triggering gap. Geometrical designs of triggering gaps for TVG devices can be classified basically in three groups, namely, the triggering gap bridged by a ceramic insulator whose surface is in radial direction of the TVG, i.e., normal to the axis of the TVG, the triggering gap bridged by a ceramic insulator whose surface is in an axial direction of the TVG device, i.e. parallel with the axis of the TVG, and the triggering gap not bridged by an insulator.

It is much easier to perform breakdown of the main gap if the voltage polarity across the main gap is such that the triggering electrode is in the vicinity of the cathode of the main gap. It is possible to break down the main gap when the polarity changes, i.e., when the triggering electrode is in the vicinity of the anode, but much higher energy is needed for successful triggering because much higher plasma density is required in the main gap for breakdown of the main gap. In order to take into account the polarity effect and have adequate triggering capability of a TVG device in AC applications, it has been proposed to have two triggering electrodes, where one triggering electrode is situated in the vicinity of each main electrode.

Since TVG devices are easily and accurately triggerable even at a relatively low voltage across the main vacuum gap of just a few kV, they have quite a small time dispersion of triggered breakdown delay of at most several microseconds. Once in current conduction they are also able to interrupt a high current at the first 60 Hz current zero, and then to have a high withstand voltage right after current interruption. These are powerful features, but those features have generally only been used in pulse power applications and not in electric power systems for synchronized closing applications. More specifically, TVG devices have an excellent capability of interrupting high frequency currents at their current zeroes and during any closing switching operation in power systems high frequency currents are created by discharging and charging stray capacitances and inductances. Those transient high frequency currents are attenuated very quickly and most often they are not even noticed when closing is performed by mechanical switches, but for TVG devices they might have a catastrophic effect. There is a high probability that a TVG device will interrupt current in one of several high frequency current zeroes that occur in the first 100 microseconds after current was initiated in the TVG device. Current interruption is a statistical event that depends on physical processes of vacuum arc, di/dt, contact material, etc. At that point the TVG device has to be retriggered, but transient high frequency currents occur again and create current zeroes in the TVG current and the TVG current is interrupted.

Very little concern is given in the literature to arc control for a vacuum arc burning in the main gap of a TVG device. That is, however, a very important issue for TVG devices used for closing operations in power systems, because if arc control is not adequate there could be melting of the main electrodes and molten drops and particles can shorten out the triggering gap. In most of the literature it is implied that the main electrodes are just contacts without any magnetic field created to control vacuum arc. For any of these TVG device designs it is possible to have reliable triggering and reliable closing without nuisance current interruption in high frequency current zeroes, if an adequate triggering circuit is used.

If it would be possible to sustain the TVG device arc and current conduction through high frequency current zeroes in a controlled manner, then the TVG device would not stop conduction at all. After 100-300 microseconds power frequency current in the TVG device would become sufficiently high and high frequency currents would become sufficiently attenuated, so that there would be no chance of creating "premature" current zeroes before the next regular current zero. This means that closing by a TVG device would be successful in a distribution or transmission power system, if the TVG device can keep its conduction in the first 300 microseconds after triggered breakdown by riding through any current zeroes during that period.

SUMMARY

The following discussion discloses and describes a triggered vacuum gap (TVG) device that has application as a closing switch for synchronized closing in distribution and transmission power systems. The TVG device controllably sustains a current arc in the device through initial current zeros created by power system transients and, thereby, prevents premature interruption of the closing operation. The TVG device includes first and second main electrodes defining a main vacuum gap therebetween and a first triggering electrode positioned proximate the first main electrode, where a first triggering gap is defined between the first main electrode and the first triggering electrode. The TVG device also includes a first triggering circuit for supplying a voltage across the triggering gap, where the first triggering circuit includes a high voltage impulse source that supplies a fast rising high voltage impulse across the triggering gap for an initial breakdown of the first triggering gap and creation of plasma for breakdown of the main gap, and a low voltage unidirectional current source that supplies current to the first triggering gap to sustain a cathode spot on the main electrode and, thereby, to prevent premature extinction of the vacuum arc in the main vacuum gap for as long as it is needed for successful synchronized closing. The TVG device can also include a second triggering electrode positioned proximate the second main electrode, where a second triggering gap is defined between the second main electrode and the second triggering electrode. A second triggering circuit of the same structure and function as the first triggering circuit would then be provided for applying voltage across the second triggering gap in the same way as the first triggering circuit is used to apply voltage across the first triggering gap. The purpose of the second triggering gap is to help triggered closing when the main gap voltage polarity is such that the first main electrode is the anode. The second triggering gap creates additional plasma for the main gap breakdown and creates a cathode spot also on the second main electrode, so that cathode spots are simultaneously present on both main electrodes. As long as cathode spots are maintained on both of the main electrodes by the first and second triggering circuits the vacuum arc cannot be extinguished at main gap current zeros. The role of the triggering circuit facilitates successful operation of the TVG device as a closing switch in power systems for providing prolonged duration of unidirectional current for maintaining the vacuum arc at main gap current zeros.

Additional features of the disclosure will become apparent from the following description and appended claims, taken in conjunction with the accompanying drawings.

DETAILED DESCRIPTION OF THE EMBODIMENTS

Figure 1:
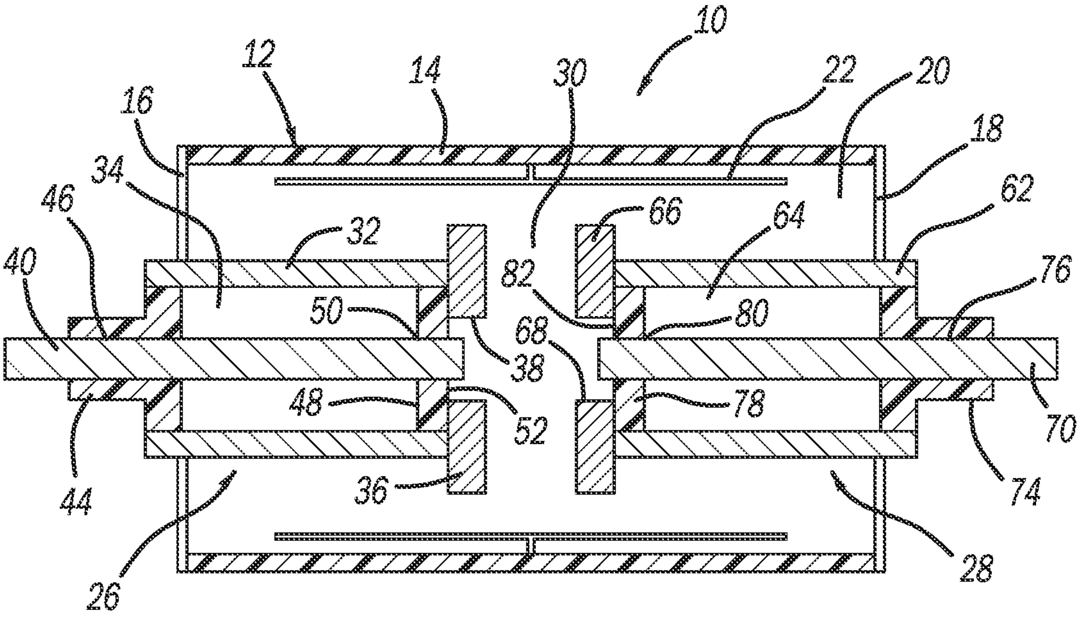
FIG. 1 is a cross-sectional view of a TVG device including two axially aligned triggering electrodes and insulating support washers adjacent to main electrodes.

The following discussion of the embodiments of the disclosure directed to a TVG device including a triggering circuit for applying voltage across a triggering gap between a main electrode and a triggering electrode, where the triggering circuit includes a high voltage impulse source and a low voltage unidirectional current source, is merely exemplary in nature, and is in no way intended to limit the disclosure or its applications or uses.

This disclosure proposes a TVG device including two triggering electrodes, where one is provided in the vicinity of each main electrode and voltage is applied across and current into each triggering gap by a separate triggering circuit for a prolonged duration after breakdown of the TVG main gap, i.e., current supplied into the triggering gap by the triggering circuit is controlling conduction of the TVG device main gap and should be present as long as TVG device conduction is desired. This disclosure also proposes a process for causing the TVG device to ride through current zeroes without interrupting main gap current. Such a TVG device with a sustained vacuum arc conduction through main gap current zeroes is suitable for a number of applications for synchronized closing in electrical power systems.

It has been experimentally determined that if a TVG device is triggered with a triggering gap initially on the main gap anode, and if a vacuum arc in the triggering gap is maintained above 30 A and with a cathode spot on the main anode until the next zero of the main gap current, then the main gap current is not interrupted at the current zero, i.e., it rides through the current zero without any problem. This happens because at the initial triggering a cathode spot is created on the main electrode that was the main gap anode at that time, and then the cathode spot is kept alive by the triggering circuit maintaining current above 30 A. After the next current zero the new main gap cathode is the electrode that was initially the main gap anode, and on which the cathode spot is preserved. So, on the new main gap cathode there is a cathode spot available right after a main gap current zero, and current conduction is continued with new main gap current direction. Without a cathode spot being maintained on the original main gap anode there would be no cathode spot available on that electrode after main gap current zero when it became the new main gap cathode.

Two triggering electrodes are provided in order to create cathode spots on both main electrodes right from the initial triggering. Each triggering electrode is provided with a triggering circuit that applies a positive polarity high voltage impulse across the triggering gap between the triggering electrode and it's corresponding main electrode, and then, after triggering gap breakdown, a prolonged duration of lower positive DC voltage. The action of the triggering circuit is not only to break down the triggering gap and create a cathode spot on the main gap electrode connected to its negative terminal, but also to maintain the cathode spot on the main gap electrode even while that main gap electrode is the anode of the main gap. In this manner there will always be an available cathode spot on a new cathode of the main gap right after any current zero, which will prevent current interruption in that current zero and provide a ride through the current zero. The triggering voltage has a similar role for a TVG device as a gate pulse has for a pair of anti-parallel thyristors. Duration of a voltage pulse is selected to be equal to or longer than an interval during which it is desired to prevent interruption of TVG main gap current.

FIG. 1 is a cross-sectional view of a TVG device 10 including an outer housing 12, usually cylindrical in shape, having an insulating ceramic wall 14, a first conductive end cap 16 and a second conductive end cap 18 defining a vacuum chamber 20, where a cylindrical metal vapor shield 22 extends from the ceramic wall 14 and into the chamber 20. The device 10 also includes a first electrode assembly 26 extending through the first end cap 16 and into the chamber 20 and a second electrode assembly 28 extending through the second end cap 18 and into the chamber 20, where a main gap 30 is defined therebetween.

The first electrode assembly 26 includes a conductive, cylindrical stem 32 having a central bore 34 and an annular main electrode 36 brazed to an end of the stem 32 in the chamber 20, where the electrode 36 includes a central, round opening 38. The electrode assembly 26 also includes a conductive rod-shaped triggering electrode 40 extending through the bore 34 along a central axis so that an end of the electrode 40 is centrally positioned within the opening 38. An insulating member 44 having a central bore 46 through which the electrode 40 extends supports and electrically isolates the stem 32 from the electrode 40 at one end proximate the end cap 16 and a ceramic insulator washer 48 having a central bore 50 through which the electrode 40 extends supports and electrically isolates the stem 32, the electrode 36 and the electrode 40 at an opposite end. A triggering gap 52 is defined between the electrode 40 and the electrode 36 along the radial surface of the washer 48 and is the shortest path between the triggering electrode 40 and the main electrode 36.

The second electrode assembly 28 includes a conductive, cylindrical stem 62 having a central bore 64 and an annular main electrode 66 brazed to an end of the stem 62 in the chamber 20, where the electrode 66 includes a central, round opening 68. The electrode assembly 28 also includes a conductive rod-shaped triggering electrode 70 extending through the bore 64 along a central axis so that an end of the electrode 70 is centrally positioned within the opening 68. An insulating member 74 having a central bore 76 through which the electrode 70 extends supports and electrically isolates the stem 62 from the electrode 70 at one end proximate the end cap 18 and a ceramic insulator washer 78 having a central bore 80 through which the electrode 70 extends supports and electrically isolates the stem 62, the electrode 66 and the electrode 70 at an opposite end. A triggering gap 82 is defined between the electrode 70 and the electrode 66 along the radial surface of the washer 78 and is the shortest path between the triggering electrode 70 and the main electrode 66.

When a suitable positive polarity high voltage impulse is applied to the triggering electrodes 40 and 70, cathode spots are created on the main electrodes 36 and 66 and electrical breakdown occurs in the triggering gaps 52 and 82 along the surface of the washers 48 and 78, which creates a separate plasma at each side of the main gap 30 that expands into the gap 30 and allows conduction between the main electrodes 36 and 66. The timing between applying voltage impulses to the triggering electrodes 40 and 70 can be slightly offset from each other, such as by 1 μs. If unidirectional current of at least 30 A is supplied into each triggering gap 52 and 82 after breakdown for a specified prolonged time interval, cathode spots on both of the main electrodes 36 and 66 will be maintained, and main gap current interruption will not happen in current zeros that might be created by closing power system transients.

Figure 2:
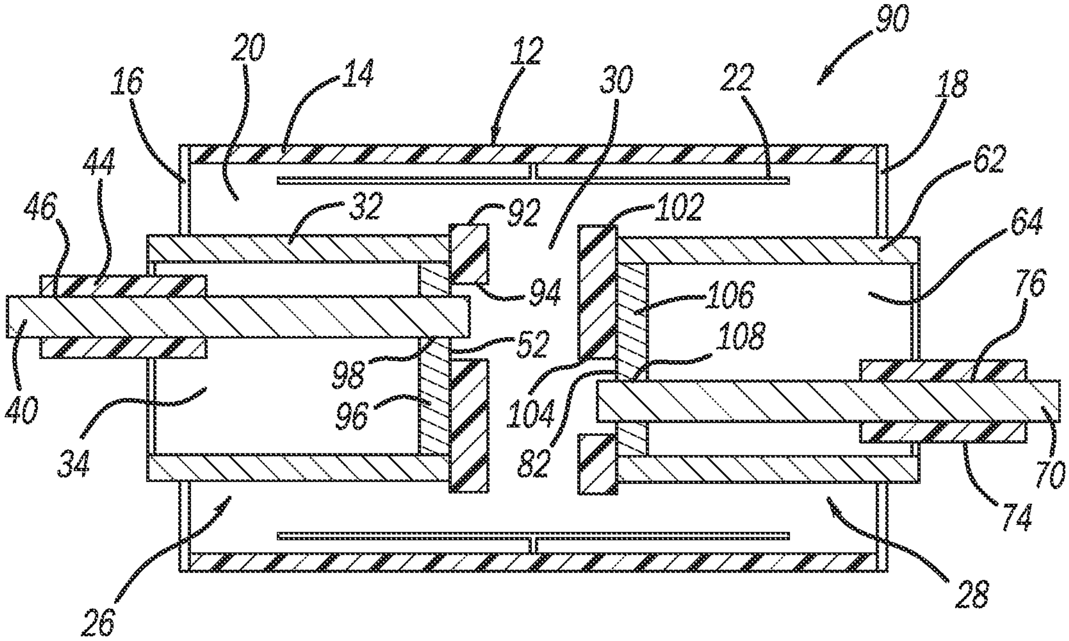
FIG. 2 is a cross-sectional view of a TVG device including two off-set triggering electrodes and insulating support washers adjacent to main electrodes.

In the TVG device 10, the triggering electrodes 40 and 70 are axial aligned. In other designs, the triggering electrodes 40 and 70 can be offset. FIG. 2 is a cross-sectional view of a TVG device 90 illustrating this design that is similar to the device 10, where like elements are identified by the same reference number. In the device 90, the electrode 36 is replaced with an electrode 92 having a non-central opening 94 and the washer 48 is replaced with a washer 96 having a non-central bore 98 through which the triggering electrode 40 extends. Likewise, the electrode 66 is replaced with an electrode 102 having a non-central opening 104 and the washer 78 is replaced with a washer 106 having a non-central bore 108 through which the triggering electrode 70 extends. Thus, the triggering electrodes 40 and 70 are not aligned, which reduces interference of the two plasma clouds created in the two triggering gaps 52 and 82.

Figure 3:
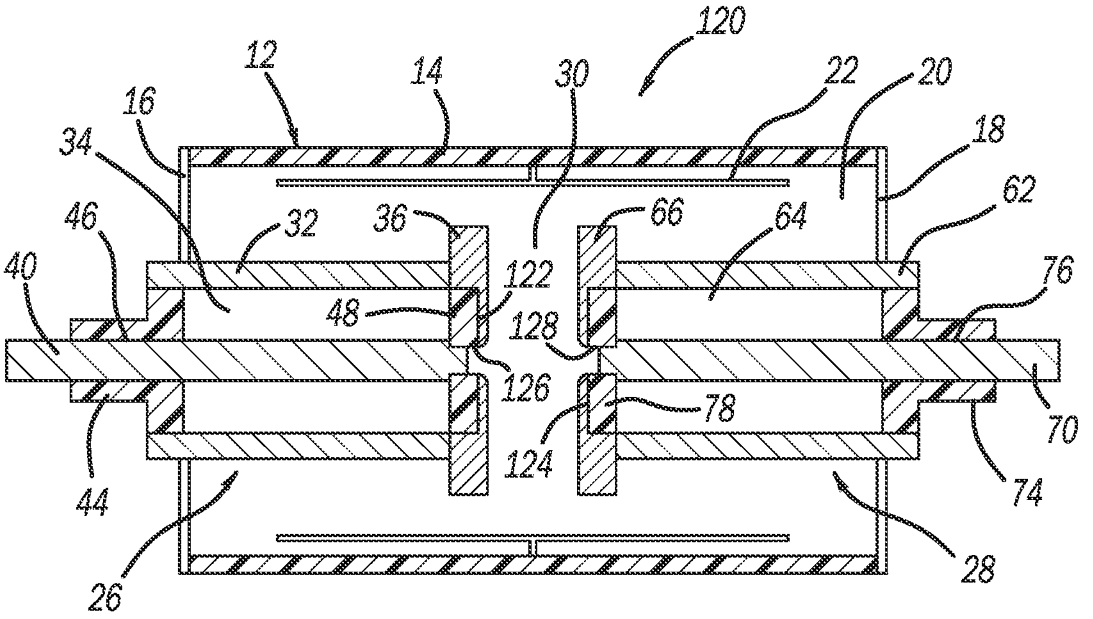
FIG. 3 is a cross-sectional view of a TVG device including two axially aligned triggering electrodes and insulating support washers within main electrodes.

In the TVG device 10, the surface of the insulating ceramic washers 48 and 78 is positioned radially relative to the triggering electrodes 50 and 70 and the main electrodes 36 and 66. In other designs, the surface of the insulating washers 48 and 78 can be positioned axially relative to the triggering electrodes 40 and 70 and the main electrodes 36 and 66. FIG. 3 is a cross-sectional view of a TVG device 120 illustrating this design, where like elements to the TVG device 10 are identified by the same reference number. In this design, the main electrodes 36 and 66 include a notch 122 and 124, respectively, where the washers 48 and 78 are seated within the notches 122 and 124, respectively, and defining triggering gaps 126 and 128, respectively.

Figure 4:
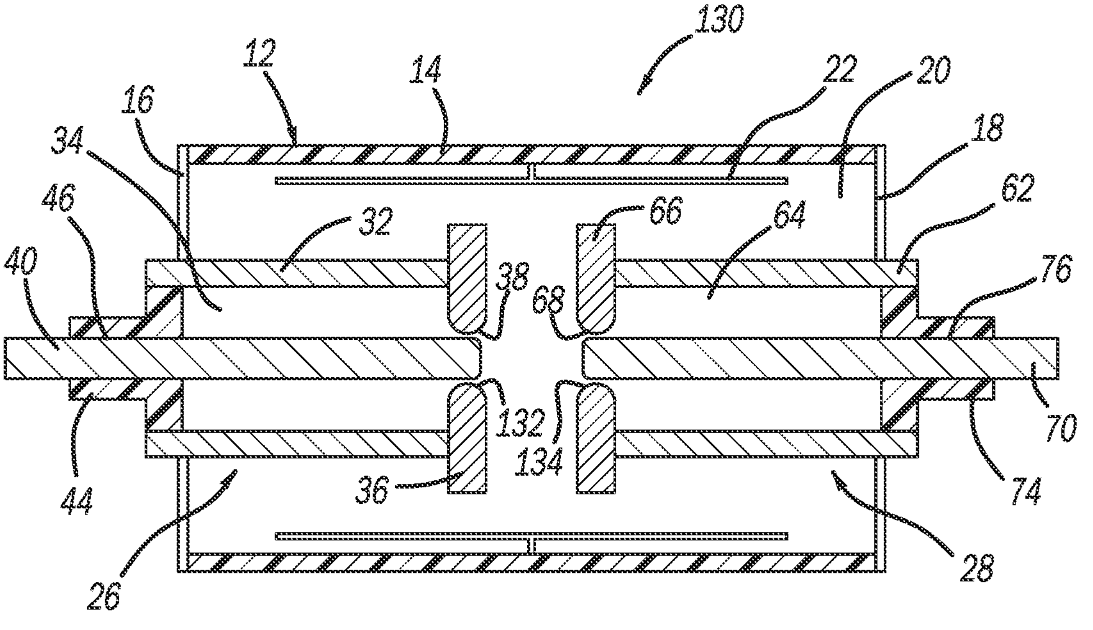
FIG. 4 is a cross-sectional view of a TVG device including two axially aligned triggering electrodes and a gap between the triggering electrodes and the main electrodes.

FIG. 4 is a cross-sectional view of a TVG device 130 illustrating another design similar to the TVG device 10, where like elements are identified by the same reference number. In this design, the insulating washers 48 and 78 are removed and open triggering gaps 132 and 134 without insulating washers are provided.

The triggering electrodes 40 and 70 are energized in a controlled manner so that the arc across the main gap 30 is not immediately extinguished by a zero-crossing of high frequency currents. An efficient TVG triggering circuit is proposed herein that performs reliable initial breakdown of the triggering gap so that the cathode spot of the vacuum arc is created on the main electrode; keeps unidirectional triggering gap current at specified, sufficiently high value for specified, sufficiently long time duration, which prevents unwanted interruption of the main gap current by high frequency transient current and prevents possible transient over-voltages created by such main gap current interruption; uses much less energy to perform TVG device triggering with prolonged triggering gap current than known triggering circuits that can provide prolonged triggering current, which is particularly important because energy for triggering has to be transferred from the ground level to the triggering circuit floating at high voltage, or harvested at high voltage potential; and has significantly smaller physical size than known triggering circuits, which is important because it is placed at high voltage.

Figure 5:
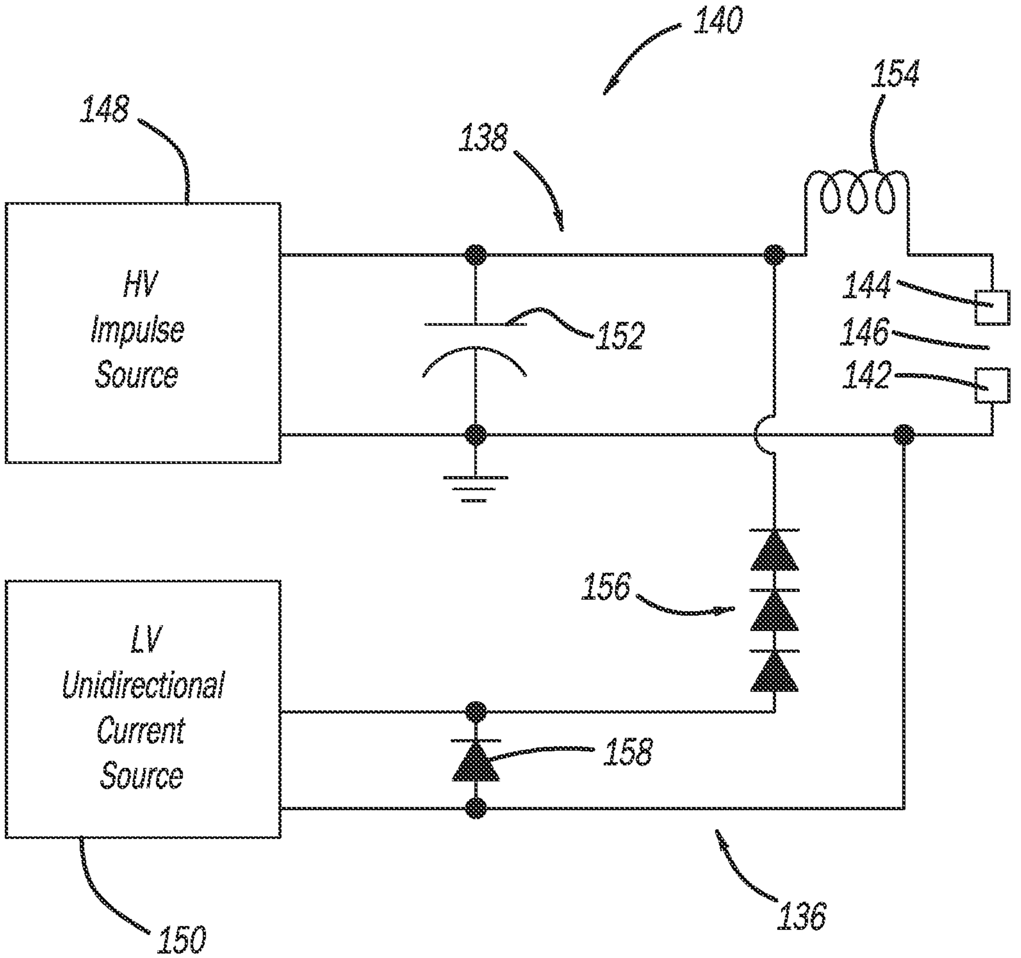
FIG. 5 is a schematic diagram of a triggering circuit for supplying voltage across and current into a triggering gap between one of the main electrodes and the corresponding triggering electrode in the TVG devices shown in any of FIGS. 1-4.

FIG. 5 is a schematic diagram of one example of a triggering circuit 140 that is able to accomplish this control. It is noted that a separate one of the circuits 140 is required for each of the triggering electrodes 40 and 70. The circuit 140 includes a triggering electrode 142, representing the triggering electrode 40, and a main electrode 144, representing the main electrode 36, defining a triggering gap 146, representing the triggering gap 52, therebetween. The triggering circuit 140 also includes a triggering loop 138 connected to the electrodes 142 and 144 and having a high voltage (HV) impulse source 148 that provides a fast rising high voltage impulse that quickly generates the plasma to create the initial arc across the main gap 30 and a maintenance loop 136 connected to the electrodes 142 and 144 and having a low voltage (LV) unidirectional current source 150 that supplies current to the triggering gap 146 for a specified duration of time, such as 300 microseconds, which is long enough to include all main gap current zero crossings created by power system transients, after triggering gap breakdown, where the loops 136 and 138 are electrically connected in parallel.

The high voltage impulse from the source 148 charges a HV capacitor 152 that stores sufficient energy to supply fast rising current for creation of the plasma during the initial breakdown of the triggering gap 146. The initial current supplied by the capacitor 152 to the triggering gap 146 is limited only by a stray inductance 154 of the conductors in the triggering electrode loop 138. The source 150 is separated from the HV impulse circuit 148 by a string of reversely directed fast diodes 156 that prevents the HV impulse from reaching the LV unidirectional current source 150. A freewheeling diode 158 is connected in parallel with the LV unipolar current source 150, where the diode 158 and the string of the diodes 156 provide a freewheeling path for the triggering gap current, and thereby prevents voltage reversal across the LV unidirectional current source 150.

Figure 6:
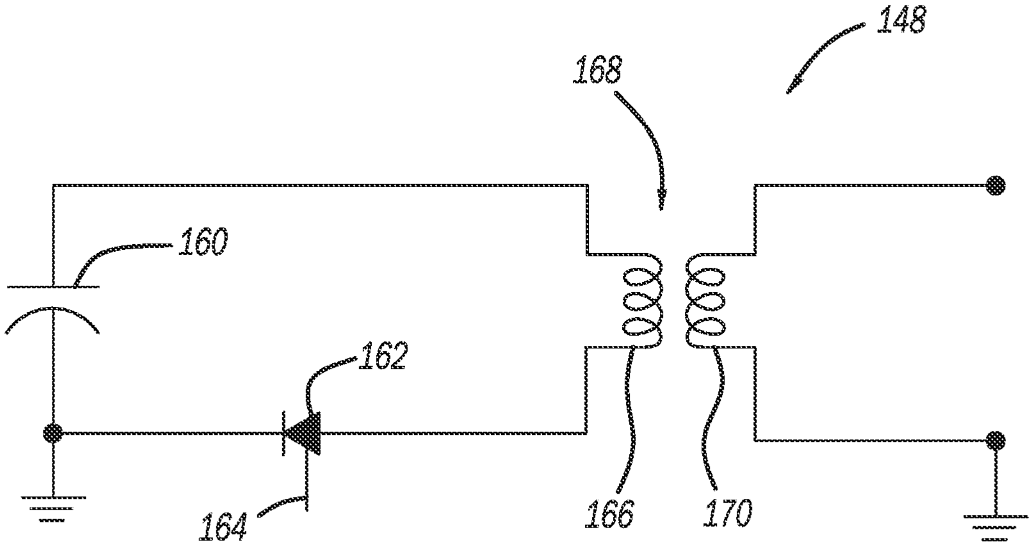
FIG. 6 is a schematic diagram of a high voltage impulse source in the triggering circuit shown in FIG. 5.

FIG. 6 is a schematic diagram of the HV impulse source 148 that includes a low voltage energy storage capacitor 160 that is initially charged by a power supply (not shown). When a thyristor 162 is turned on by a control gate voltage at its gate terminal 164, the capacitor 160 discharges through the thyristor 162 and a pulse transformer 168 having a low voltage primary winding 166 and a high voltage secondary winding 170 to charge the capacitor 152.

Figure 7:
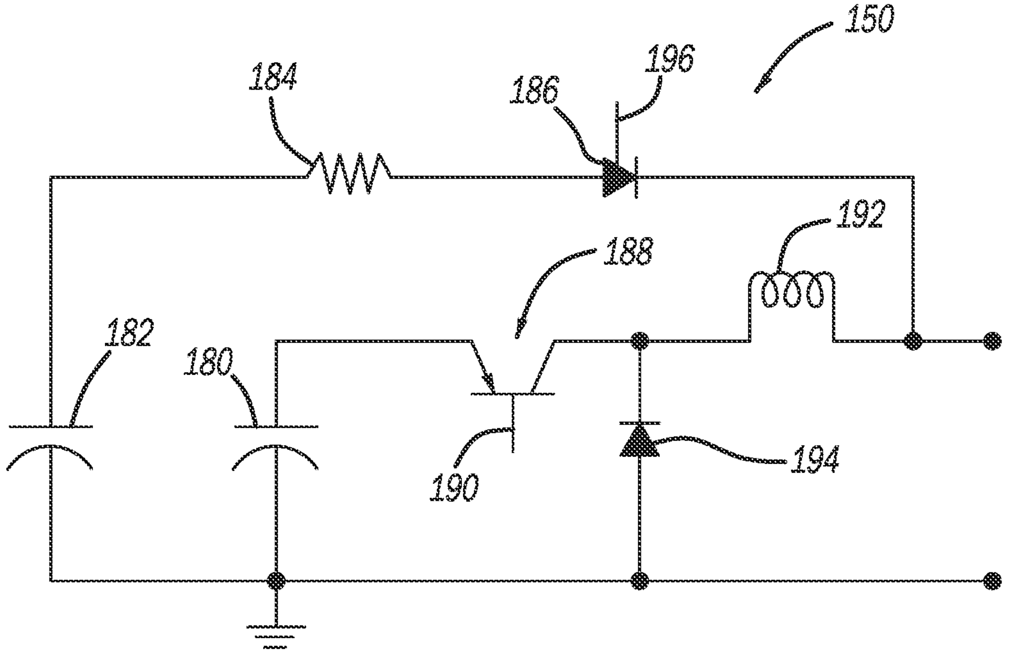
FIG. 7 is a schematic diagram of a low voltage unidirectional current source in the triggering circuit shown in FIG. 5.

FIG. 7 is a schematic diagram of the LV unidirectional current source 150 that includes two low voltage energy storage capacitors 180 and 182 that are initially charged by one or more power supplies (not shown), but cannot be discharged until the triggering gap 146 breaks down by the voltage impulse supplied by the HV impulse source 148. A thyristor 186 having a gate terminal 196 discharges the capacitor 182 and a semiconductor switch 188, such as a MOSFET, having a gate terminal 190 controllably discharges the capacitor 180. The initial turn-on signals for the thyristor 186 and the switch 188 are synchronized with the turn-on signal for the thyristor 162. Thus, when breakdown of the triggering gap 146 occurs, the capacitor 182 is quickly discharged into the triggering gap plasma through a resistor 184, the thyristor 186 and the string of diodes 156. The capacitor 180 also starts discharging when breakdown of the triggering gap 146 occurs, and is discharged through the switch 188, an inductor 192 and the string of the diodes 156. The capacitor 182 is much smaller than the capacitor 180 and functions to provide triggering gap current during the first several microseconds after breakdown of the triggering gap 146. It is possible to use a diode instead of the thyristor 186 for discharging the capacitor 182, which would prevent reverse current flow from the capacitor 180 into the capacitor 182. The capacitor 180 cannot supply high current right away because of the inductor 182, but once it reaches a specified current value, its discharging current is kept at that value and is controlled by an on-off duty cycle of the switch 188 by controlling its gate voltage. The discharge circuit of the capacitor 182 generally represents a buck converter and provides a very efficient way to deliver energy stored in the capacitor 180 to the plasma in the triggering gap 146.

The inductor current from the inductor 192 represents the output current of the unidirectional current source 150 into the triggering gap 146 after several microseconds of current flow because at that point, the capacitor 182 is completely discharged and the whole current of the current source 150 is coming from the inductor 192. The inductor current has a saw-tooth waveform with an average value $I_{out}$ and peak-to-peak ripple ΔI. The output voltage $V_{out}$ of the current source 150 includes an arc voltage of the triggering gap 146 and a forward voltage drop of the diodes 156. The on-time $t_{on}$ and off-time $t_{off}$ of the switch 188 during each saw-tooth period can be calculated as:

$$t_{on} = \frac{L_1\ \Delta I}{V_{c1} - V_{out}}, \tag{1}$$

$$t_{off} = \frac{L_1\ \Delta I}{V_{out}}, \tag{2}$$

where $V_{C1}$ is the voltage of the capacitor 180.

The output power of the current source 150 is:

$$P_{out}=I_{out}V_{out}. \tag{3}$$

The energy consumed to drive the output current into the triggering gap 146 for the time interval Δt is:

$$W_{out}=I_{out}V_{out}\Delta t. \tag{4}$$

The remaining voltage of the capacitor 180 after driving the output current for the time interval Δt is:

$$V_{C1,final} = \sqrt{\frac{2}{C_1}\left(\frac{1}{2}C_1V_{C1,initial}^2 - W_{out}\right)}, \tag{5}$$

where $V_{C1,initial}$ is the initial voltage of the capacitor 180. Typical values include average output current $I_{out}$=50 A, current ripple ΔI=10 A, output voltage $V_{out}$=35V, time duration of the supplied triggering gap current is Δt=300 μs, $L_1$=20 μH, $C_1$=50 μF, $V_{C1,initial}$=160V. From equations (1)-(5), the switch times $t_{on}$=1.6 μs, $t_{off}$=5.6 μs, final capacitor voltage $V_{C1,final}$=63.2V and initial store energy in the capacitor 180, and $W_{C1,initial}$=0.64 J are calculated.

The initial stored energy in the capacitor 180 is 1.64 times less and the inductance of the inductor 192 is 10 times less for the triggering circuit 140 than for known triggering circuits that are designed for the same output triggering gap current and the same time duration of supplied triggering gap current. This means that these main energy components are significantly physically smaller for the triggering circuit 140 and that it uses significantly less energy to drive the triggering gap current than the known triggering circuits under the same conditions.

One application of a TVG device as discussed herein includes using the triggering circuit 140 to perform synchronized closing in power systems, where the device would be part of a closing switch including a voltage sensor and a controller (not shown). The moment of closing at which power frequency current starts to flow in the device has to happen at a specified angle with respect to the system line voltage. The voltage sensor continuously sends an analog signal proportional to the system line voltage to the controller. The controller processes the voltage sensor signal, determines the moment with a specified closing angle and drives the gates of the thyristors 162 and 186 and the switch 188.

If it is required to close the TVG device at a specific closing angle, but it is not important which polarity the system line voltage is at during the device closing, a conventional TVG device with one triggering electrode can be used, however, the triggering circuit 140 discussed above will be used as it is more efficient and physically smaller than known triggering circuits. TVG device triggering will be performed at the specified closing angle, but only when the polarity of the main gap voltage is such that the corresponding main electrode will be the cathode of the main gap.

If it is required to close the TVG device at a specific closing angle in power system applications, and it is also required that the polarity of the TVG main gap is such that the corresponding main electrode is the anode of the main gap at the moment of closing, then the TVG device with one triggering electrode will not provide quite reliable closing since there will be a significant probability that closing will be unsuccessful due to premature current interruption in one of high frequency current zeroes even if the triggering gap current is supplied for a prolonged duration. Thus, if it is required to close the TVG device at a specified closing angle and to have 100% reliable closing for both polarities of the main gap voltage, a TVG device with two triggering electrodes has to be used, i.e., one triggering electrode in the vicinity of each main electrode, such as those described above.

For a TVG device having an insulator between the triggering electrode and the corresponding main electrode, there is a certain amount of metal vapor and particles deposited on the insulator surface during each closing operation, which comes mainly from the main gap vacuum arc. However, each breakdown of the triggering gap partially evaporates some amount of deposited vapor and particles from the insulator surface. For a TVG device with two triggering electrodes it is possible to have 100% reliable closing by operating only the triggering gap that is situated in the main gap electrode that is the main gap cathode at the moment of closing. By having both triggering gaps to break down in every closing operation, the cleaning action for insulators of both triggering gaps is effectively doubled and that leads to longer life and more reliable long-term operation of the TVG device with two triggering electrodes.

In some applications it may be desired to continue conduction of the TVG device for more than one-half cycle of power frequency. The TVG device has to sustain a vacuum arc through a power frequency current zero. This can be done with a TVG device with two triggering electrodes, such as those discussed above. The initial closing of the TVG device will be performed as explained above and unidirectional current will be injected into both of the triggering gaps by their triggering circuits. Here, the triggering circuits will not be turned off after the initial time interval with possibility of high frequency current zeroes is finished (typically 300 μs), where they will continue to supply current into the triggering gaps in order to keep the initial cathode spots alive both on the main gap cathode and the anode. When a power current zero occurs, cathode spots are still alive on both main electrodes and they are able to continue the main gap vacuum arc and the main gap current of the different polarity without any delay.

This disclosure proposes that the initial breakdown of the triggering gap has to be done with a positive voltage impulse between the triggering electrode and the main electrode in order to have the triggering electrode as an anode and the main electrode as a cathode of the triggering gap. For sufficiently high voltage impulse, breakdown of the triggering gap occurs and a cathode spot is created on the main electrode in the vicinity of the triggering electrode. The cathode spot produces the initial plasma in the triggering gap. This plasma expands into the main gap and causes breakdown of the main gap as well. However, breakdown of the main gap has a strong polarity effect, where how it proceeds depends on the polarity of the voltage across the main gap.

Creation of new cathode spots is possible only on the main electrode that is the cathode of the main gap at that moment, where it depends on the plasma density above the cathode of the main gap. If the main electrode in the vicinity of the triggering electrode is the cathode of the main gap, then more cathode spots are created on it in addition to the initial cathode spot created in the breakdown of the triggering gap. Since in this case the possible positions of new cathode spots are on the same main electrode close to the initial cathode spot, the plasma density is high and the new cathode spots are easily created.

If the main electrode in the vicinity of the triggering electrode is the anode of the main gap, then no new cathode spots can be created on it and only the initial cathode spot (created in the breakdown of the triggering gap) remains on the main gap anode. New cathode spots have to be created on the opposite main electrode, as it is the cathode of the main gap. In this case the plasma density above the main gap cathode is low because it is distant from the initial cathode spot on the other side of the main gap, so creation of the new cathode spots is difficult and there is a certain probability that it will be unsuccessful. For this reason the triggering electrode is always situated in the vicinity of the main gap cathode.

Considering the case where the initial voltage polarity of the main gap is such that the triggering electrode is situated in the vicinity of the main gap cathode. It is has been described above how the triggering gap and the main gap are broken down. Thus, after the breakdown the vacuum arc is created and there are several cathode spots on the main gap cathode, the initial cathode spot created by the breakdown of the triggering gap and others created after breakdown of the main gap. The triggering circuit 140 injects unidirectional current into the triggering gap that is sufficient to maintain the initial cathode spot. Current for other spots is supplied through the main electrodes from the external power system. During initial period of about 300 μs after the breakdown of the main gap there could be transient high frequency currents created by discharging of stray capacitances in the power system. Those high frequency currents are superimposed on power frequency current and can create a zero of the total current supplied by the power system to the main electrodes. When that current zero happens, all of the cathode spots on the main cathode except the initial cathode spot cease to exist, because current for those cathode spots was supplied by the external power system, while the initial cathode is still alive because its current is being supplied by the triggering circuit 140.

When all of the cathode spots are extinguished, there is still residual plasma in the main gap because the plasma cannot diffuse instantaneously. At the same time, the TVG device voltage of the reversed polarity is impressed across the main gap by the external power circuit such that the original main cathode becomes the new anode and the original anode becomes the new cathode. The residual plasma is swept off from the main gap by the electric field created by the TVG device so that electrons having much higher mobility are first swept off from the region close to the new cathode and then from the rest of the main gap (in time frame of several tens of nanoseconds). The remaining ions create space charge region across, which basically the whole TVG device is held. Eventually (in about a few microseconds) ions are also swept off by electric field and they are collected by the new cathode. Initially there are no cathode spots on the new cathode, and that is what prevents main gap current reappearance, which leads to a successful current interruption.

During this period, the initial cathode spot remains alive on the new anode as its current is driven by the triggering circuit. However, after several microseconds or tens of microseconds the TVG device voltage reverses the polarity again because normal polarity of the power system voltage without high frequency transients is the one that originally existed. The new cathode is again the original main cathode, while the new anode is the original main anode. At that moment the initial cathode spot on the original cathode is still alive and the plasma that it creates spreads and bridges the main gap. Multiple other new cathode spots are created on the main cathode and the vacuum arc is reestablished in the main gap due to the initial cathode spot that was kept alive by the triggering circuit 140.

Consider the case where the initial voltage polarity of the main gap is such that the triggering electrode is situated in the vicinity of the main gap anode. It has been explained above how the triggering gap and the main gap are broken down. Thus, after the breakdown the vacuum arc is created and there are several cathode spots on the main electrodes, the initial cathode spot created by breakdown of the triggering gap is on the main gap anode and other cathode spots created after breakdown of the main gap are on the cathode. The triggering circuit 140 injects unidirectional current into the triggering gap that is sufficient to maintain the initial cathode spot. Current for other spots is supplied through the main electrodes from the external power system. The current supplied by the external power system through the main electrodes is a superposition of power frequency current and high frequency currents, and that creates a zero of that current. When that current zero happens, all of the cathode spots on the main cathode cease to exist, because current of those cathode spots was supplied by the external power system, while the initial cathode on the main gap anode is still alive because its current is still supplied by the triggering circuit 140.

When all of the cathode spots are extinguished, there is still residual plasma in the main gap because the plasma cannot instantaneously diffuse. At the same time, the TVG device voltage of reversed polarity is impressed across the main gap by the external power circuit such that the original main cathode becomes the new anode and the original anode becomes the new cathode. The initial cathode spot is now on the new cathode, the residual plasma is still in the main gap and the current conduction continues from the initial cathode spot. More cathode spots might be created on the new cathode as well.

However, after several microseconds or tens of microseconds, the TVG device voltage reverses polarity again because the normal polarity of the power system voltage without high frequency transients is the one that originally existed. The new cathode is again the original main anode, while the new anode is the original main cathode. At this moment the initial cathode spot on the original anode remains alive because its current is supplied by the triggering circuit 140. However, all other cathode spots created on the previous cathode are extinguished because their current was supplied by the external power system and they cannot exist on the new anode. Electric field direction in the main gap is such that it cannot pull off electrons from the plasma around the initial cathode spot that is on the main gap anode. Some ions are pulled off but that current is not sufficient for quick breakdown of the main gap. This interval without actual current conduction can extend until the triggering circuit stops supplying current to the initial cathode spot.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A triggered vacuum gap (TVG) device comprising:

an outer housing having an insulating wall, a first end cap at one end of the housing and a second end cap at an opposite end of the housing, the outer housing having an internal vacuum chamber;

a first main electrode assembly including a first stem extending through the first end cap and into the vacuum chamber and a first main electrode attached to the first stem within the vacuum chamber, the first stem including a bore and the first main electrode including an opening;

a first triggering electrode extending through the bore in the first stem and into the opening in the first main electrode, wherein a first triggering gap is defined between the first main electrode and the first triggering electrode;

a second main electrode assembly including a second stem extending through the second end cap and into the vacuum chamber and a second main electrode attached to the second stem within the vacuum chamber, wherein a main gap is defined in the vacuum chamber between the first and second main electrodes; and a first triggering circuit for energizing the first main electrode and the first triggering electrode, the first triggering circuit including a first high voltage impulse source that supplies a fast rising high voltage impulse to the first main electrode and the first triggering electrode for creation of a plasma to provide an initial breakdown of the first triggering gap and breakdown of the main gap and a first low voltage unidirectional current source, which includes a first capacitor and a second capacitor that are both simultaneously discharged to supply the current to the first main electrode and the first triggering electrode for a specified duration once the first triggering gap breakdown has occurred.

2. The TVG device according to claim 1 wherein the first low voltage unidirectional current source is connected to the first triggering gap through a string of diodes that provides isolation from the high voltage impulse source.

3. The TVG device according to claim 1 wherein the first capacitor is controllably discharged to provide a unidirectional triggering gap current after the first triggering gap breakdown, the first low voltage unidirectional current source further including a buck converter circuit having a semiconductor switch, an inductor and a free-wheeling diode, wherein the semiconductor switch controls the triggering gap current.

4. The TVG device according to claim 3 wherein an output current of the buck converter circuit supplied to the first triggering gap is kept approximately constant at a level sufficient for sustaining a vacuum arc in the first triggering gap.

5. The TVG device according to claim 1 wherein the second capacitor is smaller than the first capacitor, and wherein current from the second capacitor functions to provide a high unidirectional triggering gap current for a first few microseconds after the first triggering gap breakdown and the second capacitor is discharged through a resistor with low resistance and a thyristor in order to have high current and a short duration discharge.

6. The TVG device according to claim 1 wherein prolonged duration of the unidirectional gap current supplied by the first triggering circuit prevents main gap current interruption in one of several possible high frequency current zeros created by power system closing transients.

7. The TVG device according to claim 6 wherein the first low voltage unidirectional current source supplies current to the first main electrode and the first triggering electrode for about 300 microseconds.

8. The TVG device according to claim 1 wherein the first electrode assembly includes a first insulating washer provided in the bore of the first stem and having an opening and being in contact with the first main electrode, the first triggering electrode extending through the opening in the first washer.

9. The TVG device according to claim 1 wherein the first electrode assembly includes a first insulating washer provided in a notch in the first main electrode and having an opening, the first triggering electrode extending through the opening in the first washer.

10. The TVG device according to claim 1 wherein the second stem includes a bore and the second main electrode includes an opening, the TVG device further comprising a second triggering electrode extending through the bore of the second stem and into the opening in the second main electrode, wherein a second triggering gap is defined between the second main electrode and the second triggering electrode.

11. The TVG device according to claim 10 further comprising a second triggering circuit for energizing the second main electrode and the second triggering electrode, the second triggering circuit including a second high voltage impulse circuit that supplies a fast rising high voltage impulse to the second main electrode and the second triggering electrode for creation of a plasma to provide an initial breakdown of the second triggering gap and a second low voltage unidirectional current source that supplies current to the second main electrode and the second triggering electrode once the second triggering gap breakdown has occurred.

12. The TVG device according to claim 10 wherein the opening in the first main electrode is at a center of the first main electrode and the opening in the second main electrode is at a center of the second main electrode so that the first and second triggering electrodes are axially aligned.

13. The TVG device according to claim 10 wherein the opening in the first main electrode is not at a center of the first main electrode and the opening in the second main electrode is not at a center of the second main electrode so that the first and second triggering electrodes are not axially aligned and there is an offset between the first and second triggering electrodes.

* * * * *